United States Patent
Vazquez Juarez et al.

(10) Patent No.: US 10,703,247 B2
(45) Date of Patent: Jul. 7, 2020

(54) TRASH HANDLING SYSTEM FOR A MOTOR VEHICLE

(71) Applicant: FORD GLOBAL TECHNOLOGIES, LLC, Dearborn, MI (US)

(72) Inventors: Angela Belen Vazquez Juarez, Mexico City (MX); Sergio Federico Ramirez Gutierrez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/164,248

(22) Filed: Oct. 18, 2018

(65) Prior Publication Data

US 2020/0122621 A1     Apr. 23, 2020

(51) Int. Cl.
*B60N 3/08*     (2006.01)
*B60R 13/02*    (2006.01)

(52) U.S. Cl.
CPC ............ *B60N 3/08* (2013.01); *B60R 13/0243* (2013.01)

(58) Field of Classification Search
CPC .............................. B60N 3/08; B60R 13/0243
USPC ................................................ 296/152, 146.7
See application file for complete search history.

(56) References Cited

U.S. PATENT DOCUMENTS

| | | |
|---|---|---|
| 3,357,614 A | 12/1967 | Berg |
| 3,401,409 A * | 9/1968 | Ekrut ...................... B60N 3/08 |
| | | 4/484 |
| 3,848,841 A * | 11/1974 | Rafeldt ..................... B60N 3/08 |
| | | 248/99 |
| 9,205,769 B2 | 12/2015 | Evans et al. |
| 2005/0067850 A1 * | 3/2005 | Morales .................... B60N 3/08 |
| | | 296/37.1 |
| 2008/0128460 A1 * | 6/2008 | Adler ....................... B60N 3/08 |
| | | 224/275 |
| 2015/0203015 A1 * | 7/2015 | Evans ...................... B60N 3/08 |
| | | 296/37.12 |
| 2016/0368428 A1 * | 12/2016 | Stiff ......................... B60N 3/08 |
| 2018/0186267 A1 * | 7/2018 | Cressy ..................... B60N 3/08 |
| 2018/0281653 A1 * | 10/2018 | Guilhem .................. B60N 3/08 |
| 2019/0185215 A1 * | 6/2019 | Reid ........................ B65D 33/14 |
| 2019/0366901 A1 * | 12/2019 | Stoner ................... B65F 1/1415 |

FOREIGN PATENT DOCUMENTS

| | | | | |
|---|---|---|---|---|
| CN | 201587691 U | 9/2010 | | |
| CN | 203512483 U | 4/2014 | | |
| CN | 204776947 U | 11/2015 | | |
| DE | 4233920 | * 4/1994 | ............... | B60N 3/08 |

(Continued)

OTHER PUBLICATIONS

Computer translation of DE 4233920 (Year: 1994).*

(Continued)

*Primary Examiner* — Gregory A Blankenship
(74) *Attorney, Agent, or Firm* — David Coppiellie; King & Schickli, PLLC (57) ABSTRACT

An apparatus is provided for conveniently and efficiently handling trash generated during operation of a motor vehicle. That apparatus includes a housing having a receiver, a trash receptacle held in the receiver and a retention feature carried on the housing. The retention feature is displaceable between a first position and a second position whereby the apparatus may be secured in a pocket of a trim panel of the motor vehicle.

20 Claims, 9 Drawing Sheets

(56) References Cited

FOREIGN PATENT DOCUMENTS

| KR | 101020606 B1 | 3/2011 |
|---|---|---|
| WO | 0208014 A1 | 1/2002 |
| WO | 02074631 A1 | 9/2002 |

OTHER PUBLICATIONS

English Machine Translation of CN201587691U dated Sep. 22, 2010.
English Machine Translation of CN203512483U dated Apr. 2, 2014.
English Machine Translation of CN204776947U dated Nov. 18, 2015.
English Machine Translation of KR101020606B1 dated Mar. 9, 2011.
"Foldable Plastic Car Trash Can Bucket for Garbage Trash Bin Waste Rubbish Bag Holder Auto Car Organizer Accessories"; Chines Parts Pro; https://www.chinesepartspro.com/products/vingtank-foldable-plastic-car-trash-can-bucket-for-garbage-trash-bin-waste-rubbish-bag-holder-auto-car-organizer-accessories; pp. 1 of 1; printed on Oct. 18, 2018.

* cited by examiner

TRASH HANDLING SYSTEM FOR A MOTOR VEHICLE

TECHNICAL FIELD

This document relates generally to a new and improved system or apparatus adapted to conveniently and efficiently handle trash generated during operation of a motor vehicle.

BACKGROUND

Trash is often generated by a driver or a passenger during operation of a motor vehicle. This document relates to a new and improved system or apparatus adapted to conveniently and efficiently hold trash generated during motor vehicle operation while also allowing for its simple disposal from the motor vehicle at a convenient time.

SUMMARY

In accordance with the purposes and benefits described herein, a new and improved apparatus is provided for conveniently and efficiently holding and then allowing for the disposal of trash such as candy bar wrappers, chewing gum wrappers, lollipop sticks, scraps of paper, straws, disposable cups, disposable bottles or the like generated while occupying a motor vehicle. That apparatus comprises a housing, including a receiver, a trash receptacle held in the receiver and a retention feature carried on the housing. That retention feature is displaceable between a first or home position and a second or mounting position.

More particularly, the retention feature may include a first leg. Further, the retention feature may include a second leg. Further the retention feature may include a first biasing element biasing the first leg and the second leg toward the second position.

The apparatus may further include an actuator carried on the housing. That actuator may be displaceable between a leg engaging position and a leg releasing position. In addition, the apparatus may include a second biasing element adapted to bias the actuator toward the leg engaging position.

Still further, the first leg may include a first rack. The second leg may include a second rack. The actuator may include a first pawl releasably engaging the first rack and a second pawl releasably engaging the second rack.

Still further, the first leg may project from a first side of the housing. The second leg may project from a second side of the housing. Further, the receiver may include a collar carried on the housing. Still further, a retaining ring may be provided to secure the trash receptacle to the collar.

The apparatus may also include an optional locking feature adapted to lock the actuator in the leg engaging position. That locking feature may comprise a sliding button carried on the housing. That sliding button may include a projecting lug and the actuator may include a notch wherein the projecting lug engages in the notch when the sliding button is displaced into a locking position.

Still further, the apparatus may include a trim panel within a passenger compartment of a motor vehicle. That trim panel may include a pocket having a first wall and a second wall. The housing may be inserted into the pocket with the trash receptacle hidden from view by the trim panel. Still further, the housing may be held in the pocket by engaging the first leg against the first sidewall and engaging the second leg against the second sidewall. Further, it should be appreciated that the trim panel may be carried on a door of the motor vehicle. In such an arrangement, one can easily access the opening in the trash receptacle at the receiver to allow trash to be placed into the trash receptacle through that opening where it is conveniently stored while being hidden from view. The housing and the trash receptacle held in the receiver of the housing may then be easily removed in order to remove and discard the trash.

In the following description, there are shown and described several preferred embodiments of the apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof.

Reference will now be made in detail to the present preferred embodiments of the apparatus, examples of which are illustrated in the accompanying drawing figures.

DETAILED DESCRIPTION

Figure 1:
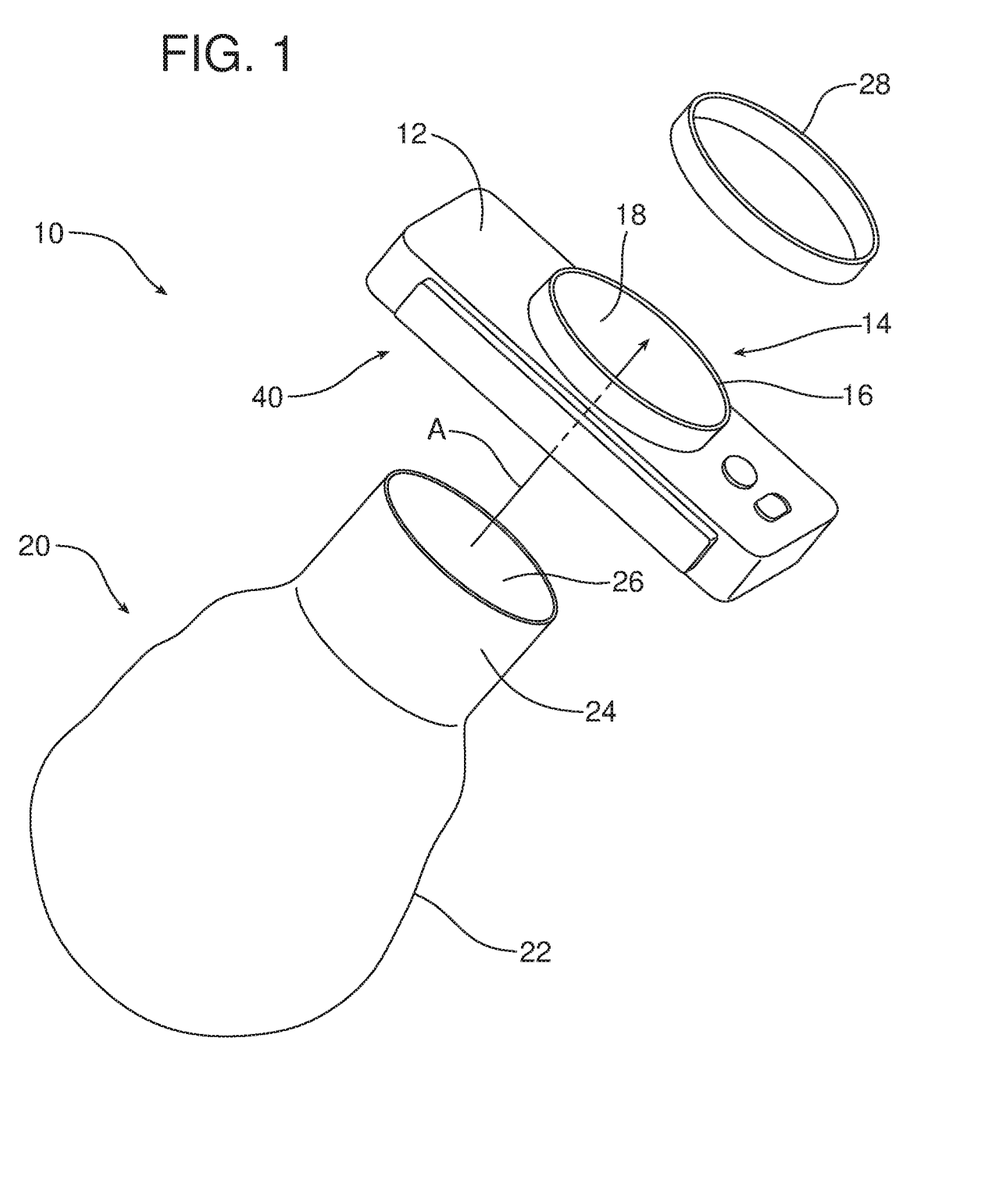
FIG. 1 is a partially exploded perspective view of the apparatus clearly illustrating the housing, the trash receptacle and the retaining ring utilized to secure the trash receptacle to the collar of the receiver provided on the housing.
Figure 2:
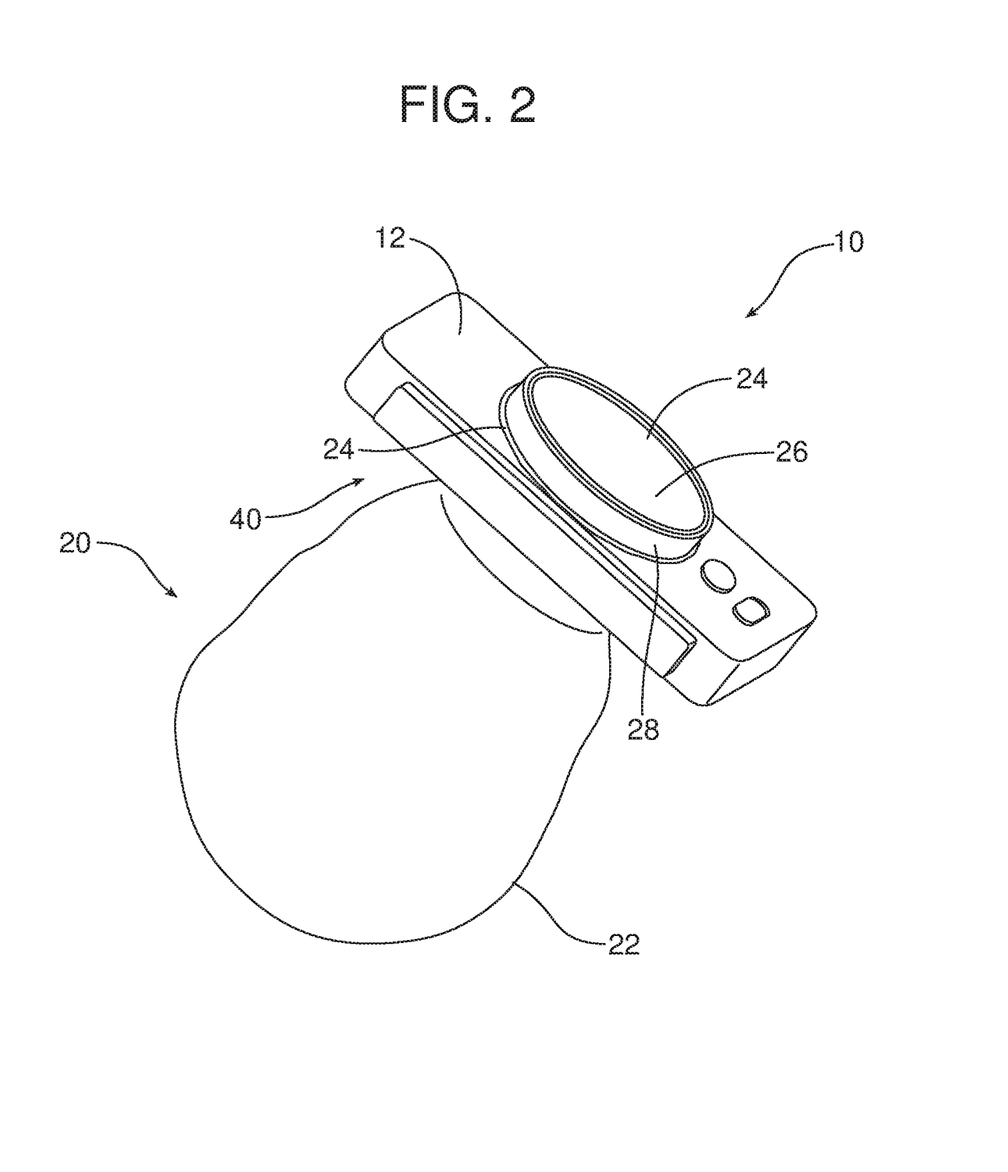
FIG. 2 is a perspective view illustrating the apparatus of FIG. 1 in the fully assembled condition.

Reference is now made to the FIGS. 1-7 illustrating a first embodiment of the new and improved apparatus 10 for efficiently and conveniently handling trash generated during operation of a motor vehicle. As illustrated in FIGS. 1 and 2, the apparatus 10 includes a housing 12, having a receiver 14. The receiver 14 comprises a collar 16, carried on the housing 12, that extends around an opening 18.

The apparatus 10 also includes a trash receptacle 20 that is held in the receiver 14. In the illustrated embodiment, the trash receptacle 20 comprises a flexible plastic bag 22. The flexible plastic bag 22 is inserted through the opening 18 within the collar 16 (note action arrow A) and the margin 24 of the flexible plastic bag defining the bag opening 26 is folded over the collar 16. A retaining ring 28 is then secured over the collar 16 so that the margin 24 of the flexible plastic bag 22 is captured between the retaining ring 28 and the collar.

Figure 3:
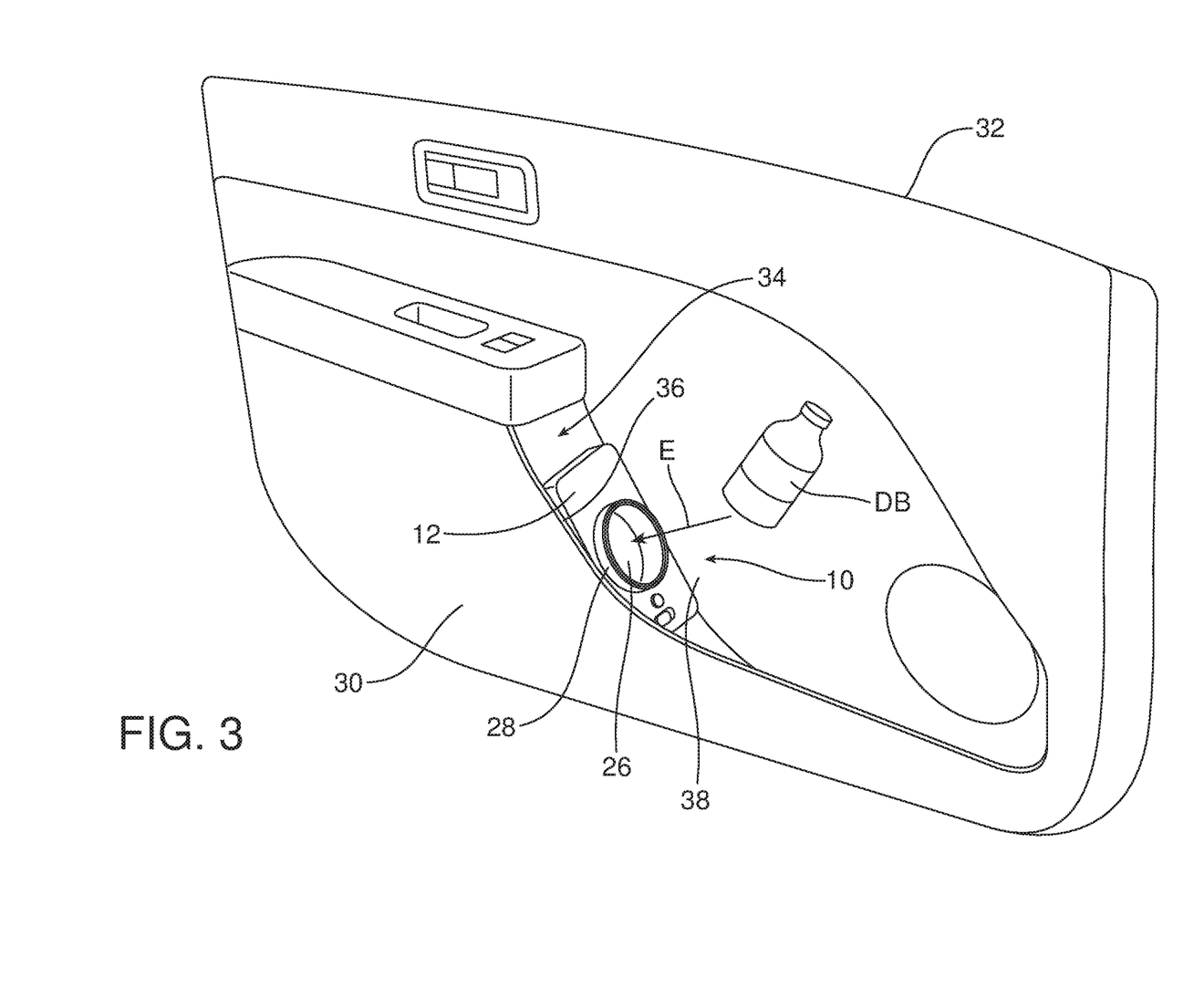
FIG. 3 is a perspective view illustrating the assembled portion of the apparatus in FIG. 2 mounted between two walls within a pocket of a trim panel on a door of a motor vehicle.
Figure 4:
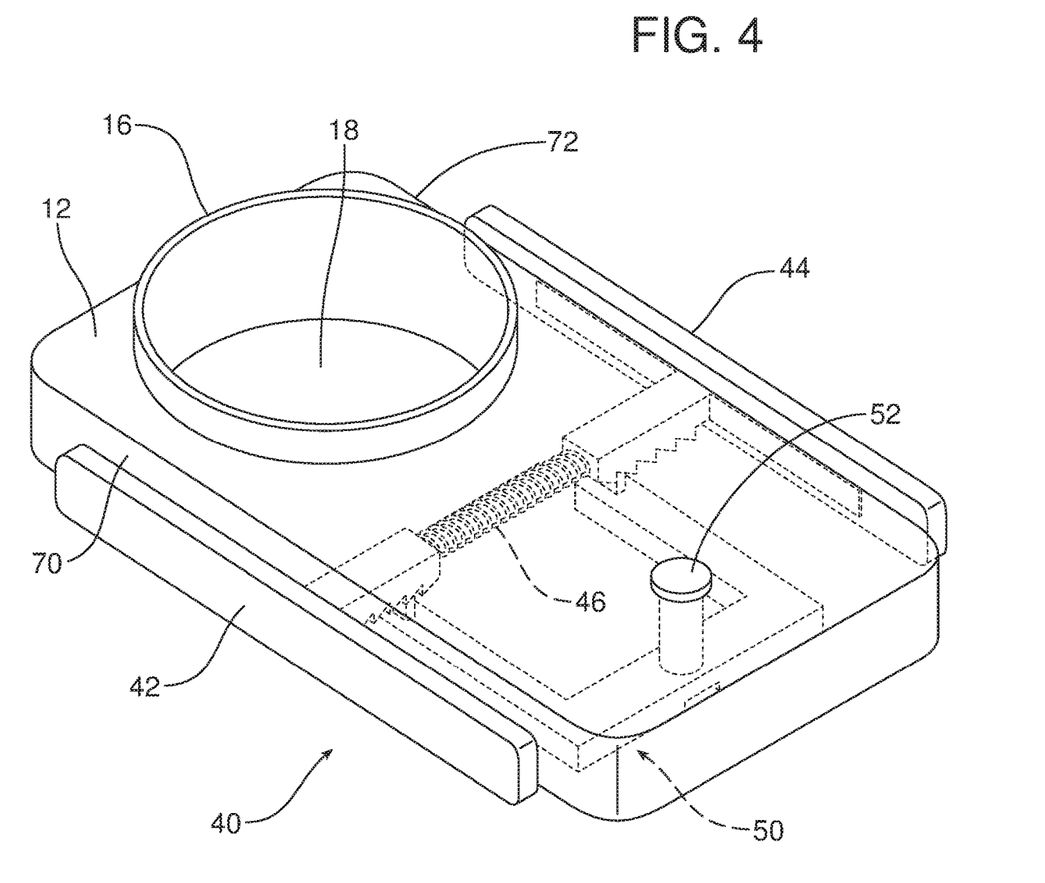
FIG. 4 is a perspective view illustrating the retention feature and associated actuator carried within the housing wherein the legs of the retention feature are illustrated in a first or retracted position.
Figure 5:
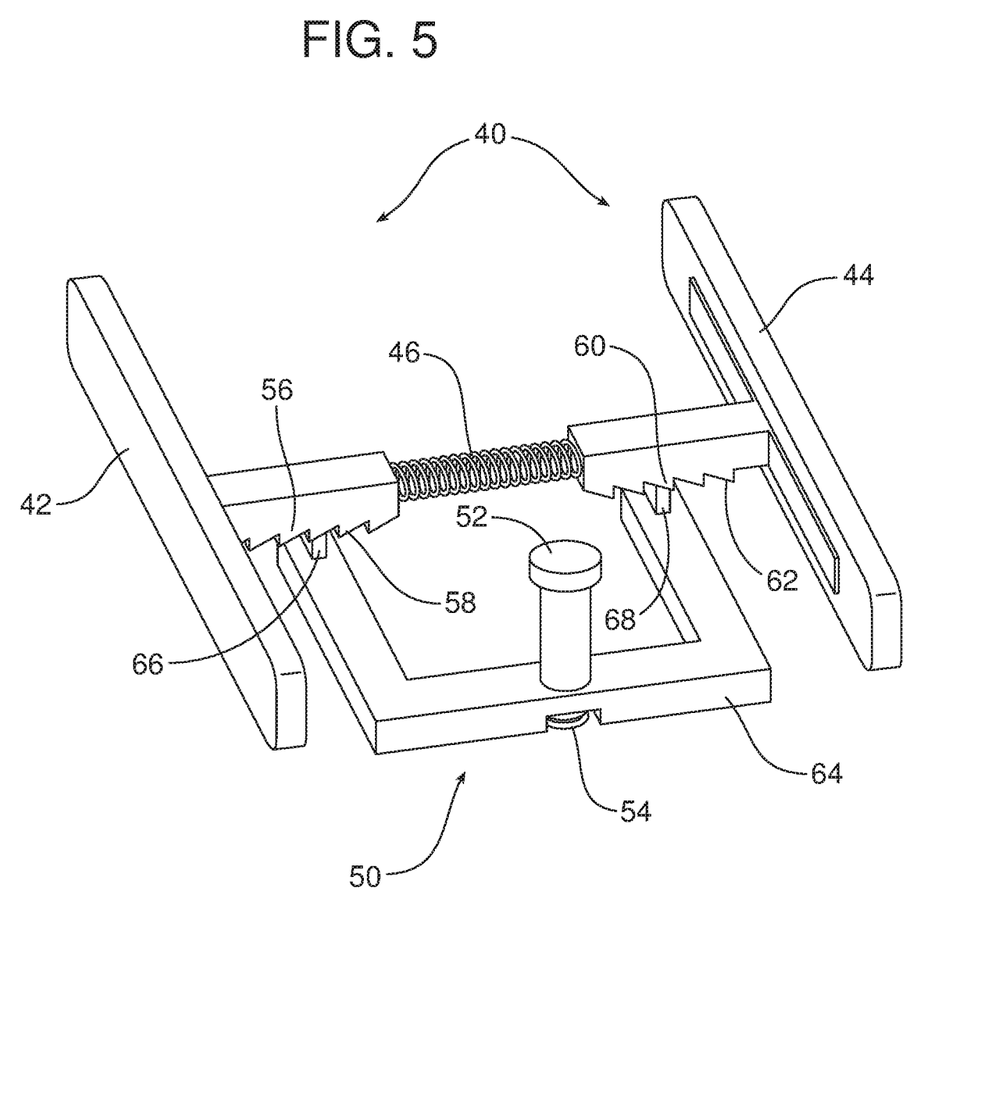
FIG. 5 is a detailed perspective view of the retention feature and cooperating actuator wherein the actuator is in a leg engaging position.

As best illustrated in FIG. 3, the apparatus may further include a trim panel 30 within a passenger compartment of a motor vehicle. More specifically, the trim panel 30 may be carried on a door 32 of the motor vehicle. Further, the trim panel 30 may include a pocket 34 having a first sidewall 36 and a second sidewall 38 wherein the first wall and second wall are opposed to one another. As will become apparent from the following description, the housing 12 with the attached trash receptacle 20 may be inserted into the pocket 34 with the trash receptacle 20 hidden from view by the trim panel. Further, the housing 12 may be held in the place in the pocket 34 by operation of a retention feature, generally designated by reference numeral 40, carried on the housing 12. That retention feature 40 is displaceable between a first or retracted position and a second or extended position.

More particularly, as best illustrated in FIGS. 4-7, the retention feature 40 includes a first leg 42, a second leg 44 opposite the first leg and a first biasing element 46 biasing the first and second legs apart toward the second or extended position.

As also shown in FIGS. 4-7, the apparatus 10 further includes an actuator, generally designated by reference numeral 50, carried on the housing 12. In the illustrated embodiment, the actuator 50 includes a push button 52 that is displaceable between a leg engaging position illustrated in FIGS. 4, 5 and 7 and a leg releasing position illustrated in FIG. 6. A second biasing element 54 in the form of a compression spring functions to bias the actuator toward the leg engaging position. One end of the second biasing element 54 is received in a socket or over a post (not shown) provided on the housing 12.

More specifically, the first leg 42 includes a first rack 56 comprising a plurality of teeth 58. Similarly, the second leg 44 includes a second rack 60 comprising a plurality of teeth 62. The actuator 50 also includes a U-shaped frame 64 having a first pawl 66 at a first end and a second pawl 68 at a second end.

Figure 6:
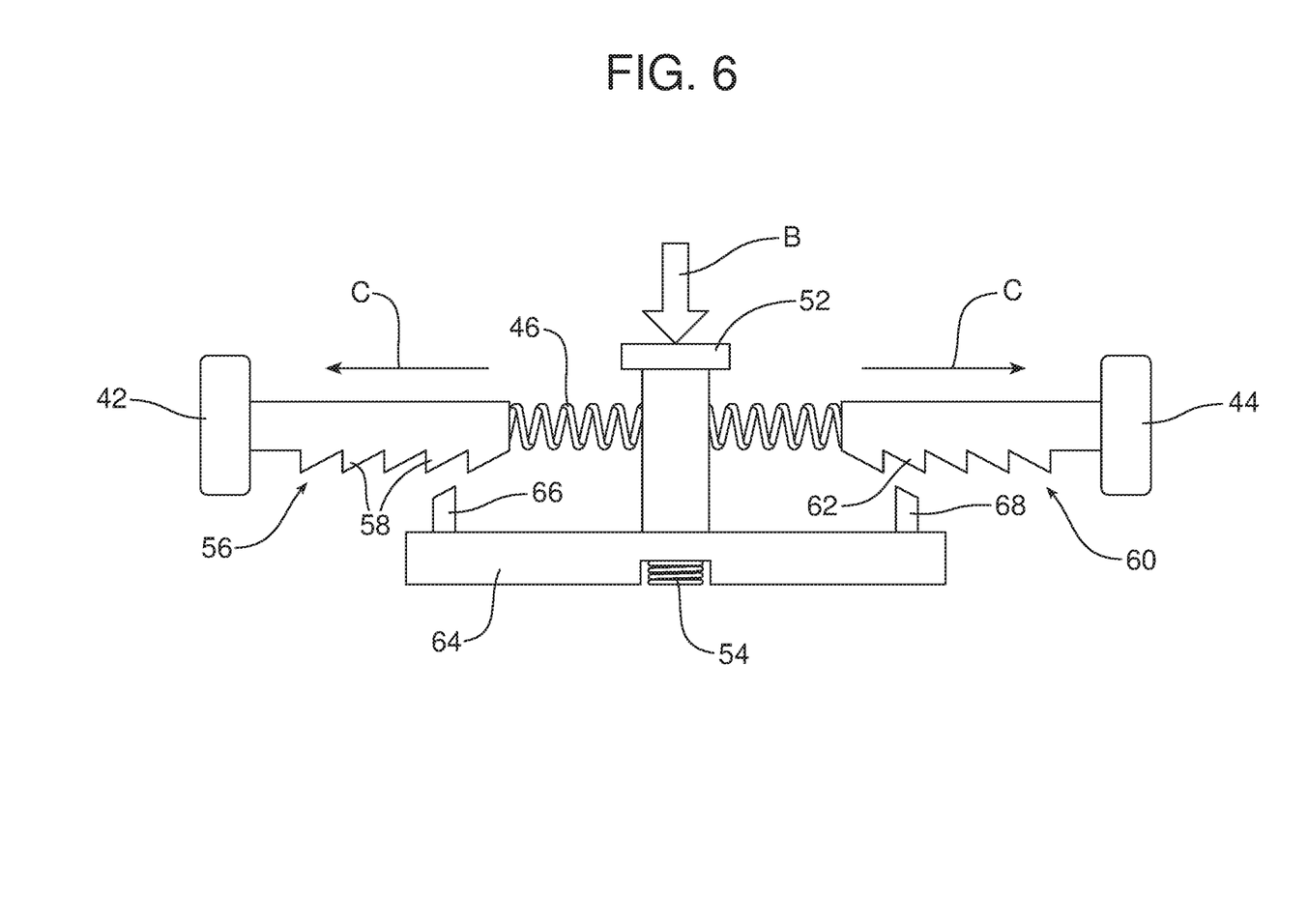
FIG. 6 is an end elevational view of the retention feature and actuator when the actuator is in a leg releasing position and the first biasing element is biasing the legs into a second or extended position.

As illustrated in FIG. 6, when one depresses the actuator 50 by pressing down on the push button 52 in the direction of action arrow B, the actuator is displaced against the biasing force of the second biasing element 54 and the first pawl 66 is released from engagement with the teeth 58 of the first rack 56 while the second pawl 68 is released from engagement with the teeth 62 of the second rack 60. This in turn allows the first biasing element 46, in the form of a compression spring, to bias the first leg 42 and second leg 44 outwardly in the directions of action arrows C so that the first leg extends outward from the first side 70 of the housing 12 while the second leg extends outward from the second side 72 of the housing.

Figure 7:
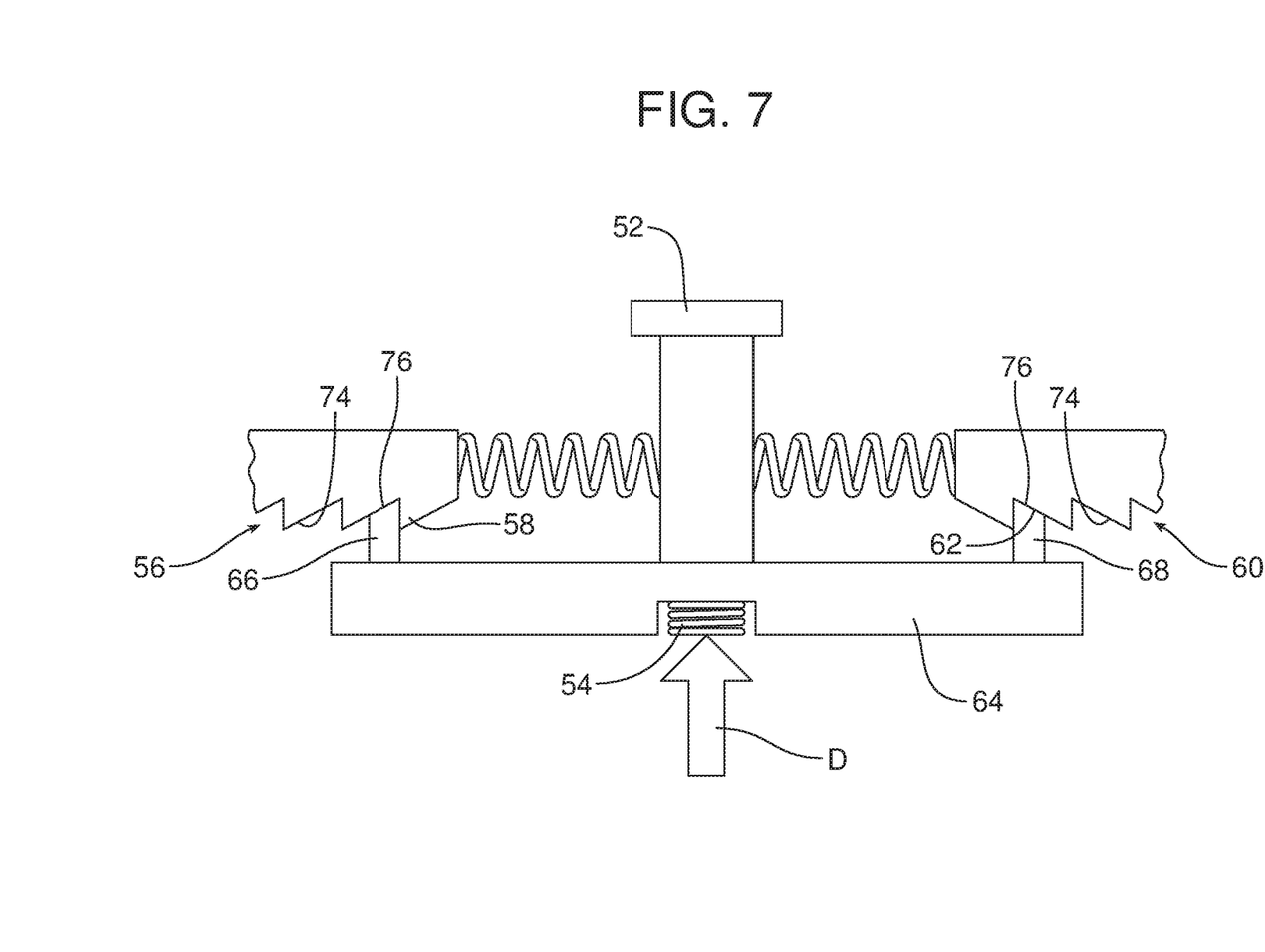
FIG. 7 is a detailed end elevational view illustrating the actuator in the leg engaging position with pawls of the actuator engaging racks carried on the legs.

As illustrated in FIG. 7, when one releases pressure on the push button 52 of the actuator 50, the second biasing element 54 biases (note action arrow D) the actuator back to the home position with the first pawl 66 engaging a tooth 58 of the first rack 56 and the second pawl 68 engaging a tooth 62 of the second rack 60 and thereby locking the legs 42, 44 in a desired extended position.

When one wishes to secure the housing 12 with the trash receptacle 20 within the pocket 34 of the trim panel 30, one positions the first and second legs 42, 44 of the retention feature 40 in the first or fully retracted position. Once the housing 12 is positioned at the desired location within the pocket 34, one depresses the actuator 50 as illustrated in FIG. 6, in order to position the actuator in a leg releasing position. The first biasing element 46 then biases the opposed first and second legs 42, 44 outward as illustrated by action arrow C until the first leg 42 engages against the first sidewall 36 and the second leg 44 engages against the second sidewall 38. The operator then releases the actuator 50 so that the second biasing element 54 biases the actuator into the leg engaging position as illustrated in FIG. 7 with the first pawl 66 engaging the aligned tooth 58 of the first rack 56 and the second pawl 68 engaging the aligned tooth 62 of the second rack 60. This engagement functions to lock the first and second legs 42, 44 in position in engagement with the opposed first and second sidewalls 36, 38 of the pocket 34 thereby securing the housing 12 and the flexible plastic bag 22 held thereby in the desired position in the pocket 34 where the flexible plastic bag 22 is hidden from view by the trim panel 30. At the same time, it should be appreciated that the bag opening 26 is oriented by the receiver 14 at an angle allowing one to easily access that opening and discard small trash items such as the drunk bottle DB illustrated in FIG. 3 (note action arrow E) into the trash receptacle 20.

When one later wishes to dispose of the trash held in the trash receptacle 20, one simply pushes the first and second legs 42, 44 together toward the first or retracted position thereby freeing the housing 12 from the sidewalls 36, 38 of the pocket 34. Here it should be noted that the cooperating sloped cam faces 74, 76 of the teeth 58, 62 and pawls 66, 68 allow for this displacement even when the actuator 50 is in the home position.

The housing 12 and the attached trash receptacle 20 are then removed from the pocket 34. The trash receptacle 20 may then be emptied. Alternatively, the trash receptacle 20 may be replaced by first releasing the retaining ring 28 from the collar 16 and then removing the flexible plastic bag 22 from the receiver 14. A new flexible plastic bag 22 may then be positioned in the receiver 14 with the margin 24 thereof folded over the collar 16. The retaining ring 28 may then be repositioned over the collar 16 to capture the margin 24 of the flexible plastic bag 22 between the collar and the retaining ring. The housing 12 may then be returned to its desired position within the pocket 34 in the manner previously described. Advantageously, it should be appreciated that the apparatus 10 allows for the simple and convenient handling of trash including the disposal of that trash from the motor vehicle.

Figure 8:
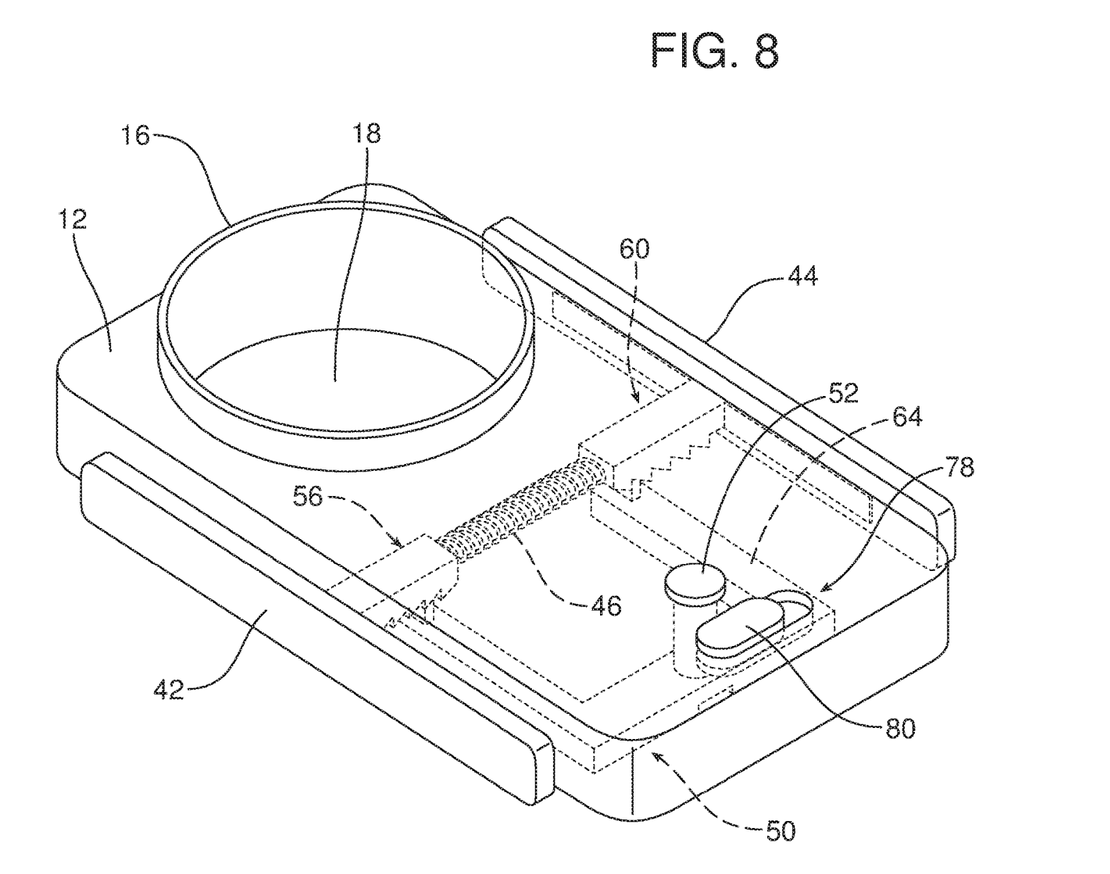
FIG. 8 is a view similar to FIG. 4 but illustrating an alternative embodiment of the apparatus that incorporates a locking feature.
Figure 9:
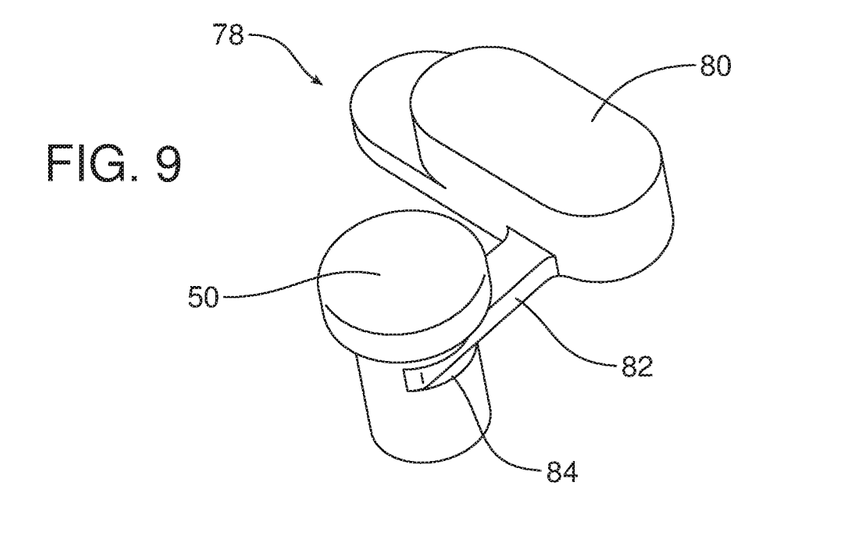
FIG. 9 is a detailed perspective view of the locking feature in the locking position wherein a projecting lug on the locking feature engages in a notch on the actuator.
Figure 10:
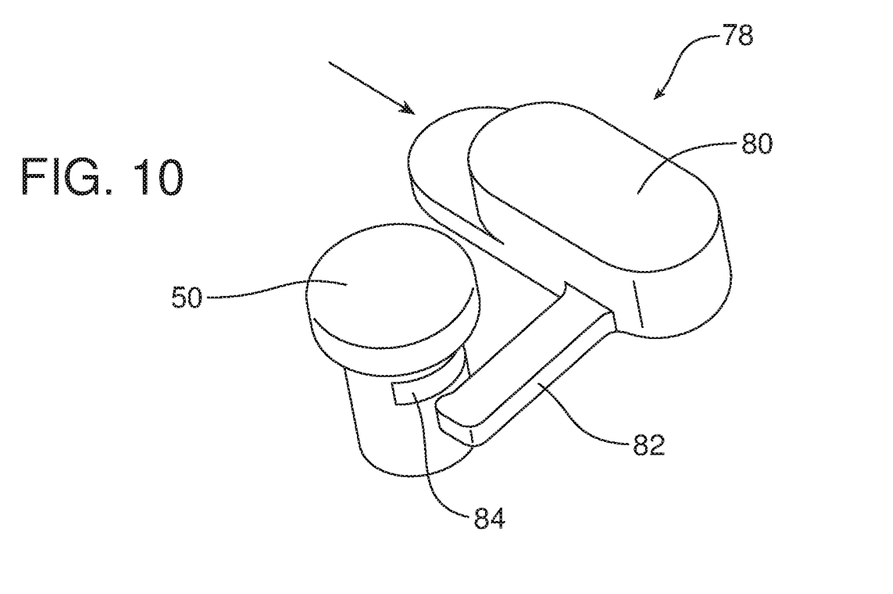
FIG. 10 is a perspective view illustrating the locking feature in an unlocked position wherein the projecting lug is free of the notch on the actuator.

Reference is now made to FIGS. 8-10 illustrating an alternative embodiment of the apparatus 10. The alternative embodiment of the apparatus 10 illustrated in FIGS. 8-10 incorporates all of the structural features of the first embodiment illustrated in FIGS. 1-7 and those structural features are identified by the same reference numbers. In addition, the alternative embodiment of the apparatus 10 illustrated in FIGS. 8-10 includes a locking feature generally designated by reference number 78. More specifically, the locking feature 78 is adapted to lock the actuator 50 in the leg engaging position illustrated in FIGS. 4, 5 and 7. More particularly, the locking feature 78 comprises a sliding button 80 carried on the housing 12. As illustrated, the sliding button 80 includes a projecting lug 82. The actuator 50 includes a cooperating notch 84. As illustrated in FIG. 9, when the actuator 50 is in the leg engaging position, the sliding button 80 of the locking feature 78 may be displaced into the locking position wherein the projecting lug 82 engages in the notch 84 to prevent the actuator from being displaced downwardly as illustrated in FIG. 6 into the leg releasing position. Thus, it should be appreciated that the locking feature 78 may be utilized to lock the actuator 50 in the leg engaging position and prevent inadvertent displacement of the actuator into the leg releasing position.

In contrast, when the locking feature 78 is in the unlocked position, the projecting lug 82 on the sliding button 80 is free of the notch 84 on the actuator 50. Thus, the actuator 50 is free to be moved into the leg releasing position from the leg engaging position when the locking feature is in the unlocked position.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
   a housing including a receiver;
   a trash receptacle held in said receiver;
   a retention feature carried on said housing, said retention feature being displaceable between a first position and a second position wherein said retention feature includes a first leg, a second leg and a first biasing element biasing said first leg and said second leg toward said second position; and
   an actuator carried on said housing, said actuator being displaceable between a leg engaging position and a leg releasing position.

2. The apparatus of claim 1, further including a second biasing element biasing said actuator toward said leg engaging position.

3. The apparatus of claim 2, wherein said first leg includes a first rack and said second leg includes a second rack.

4. The apparatus of claim 3, wherein said actuator includes a first pawl releasably engaging said first rack and a second pawl releasably engaging said second rack.

5. The apparatus of claim 4, wherein said first leg projects from a first side of said housing and said second leg projects from a second side of said housing.

6. The apparatus of claim 5, wherein said receiver includes a collar carried on said housing.

7. The apparatus of claim 6, further including a retaining ring securing said trash receptacle to said collar.

8. The apparatus of claim 5, further including a locking feature adapted to lock said actuator in said leg engaging position.

9. The apparatus of claim 8, wherein said locking feature is a sliding button carried on said housing.

10. The apparatus of claim 9, wherein said sliding button includes a projecting lug and said actuator includes a notch wherein said projecting lug engages in said notch when said sliding button is displaced into a locking position.

11. The apparatus of claim 10, further including a trim panel within a passenger compartment of a motor vehicle.

12. The apparatus of claim 11, wherein said trim panel includes a pocket having a first wall and a second wall.

13. The apparatus of claim 12, wherein said housing is inserted into said pocket with said trash receptacle hidden from view by said trim panel.

14. The apparatus of claim 13, wherein said housing is held in said pocket by engaging said first leg against a first sidewall of said trim panel and engaging said second leg against a second sidewall of said trim panel.

15. The apparatus of claim 14, wherein said trim panel is carried on a door of said motor vehicle.

16. An apparatus, comprising:
    a housing including a receiver;
    a trash receptacle held in the receiver;
    a trim panel within a passenger compartment of a motor vehicle, said trim panel including a pocket holding said housing; and
    a retention feature carried on said housing, said retention feature being displaceable between a retracted position adapted for inserting and removing said housing and an extended position adapted for engaging walls of said pocket and securing said housing in said pocket.

17. The apparatus of claim 16, wherein said retention feature includes a first leg.

18. The apparatus of claim 17, wherein said retention feature includes a second leg.

19. The apparatus of claim 18, wherein said retention feature includes a first biasing element biasing said first leg and said second leg toward said extended position.

20. The apparatus of claim 19, further including an actuator carried on said housing, said actuator being displaceable between a leg engaging position and a leg releasing position.

\* \* \* \* \*